United States Patent [19]

Hauser

[11] 4,296,079

[45] Oct. 20, 1981

[54] METHOD OF MANUFACTURING ALUMINUM SULFATE FROM FLUE GAS

[75] Inventor: H. William Hauser, Marietta, Ga.

[73] Assignee: Vinings Chemical Company, Atlanta, Ga.

[21] Appl. No.: 170,772

[22] Filed: Jul. 21, 1980

Related U.S. Application Data

[63] Continuation of Ser. No. 877,038, Feb. 10, 1978, abandoned.

[51] Int. Cl.$^3$ .............................................. C01B 17/00
[52] U.S. Cl. .............................. 423/242; 423/512 A; 423/551; 423/556
[58] Field of Search ............... 423/242 A, 242 R, 243, 423/244 A, 244 R, 551, 512 A, 556

[56] References Cited

U.S. PATENT DOCUMENTS 3,764,654  10/1973  Shah .................................... 423/242
3,920,794  11/1975  La Mantia et al. ................. 423/242
4,162,299  7/1979  Takeyama et al. ................. 423/242

FOREIGN PATENT DOCUMENTS 5128586  9/1973  Japan .................................. 423/242

*Primary Examiner*—Earl C. Thomas
*Assistant Examiner*—Gregory A. Heller
*Attorney, Agent, or Firm*—Harold L. Marquis

[57] ABSTRACT

A continuous process for removing sulfur dioxide from flue gas by reacting sodium aluminate solution with sulfur dioxide to form sodium sulfite and aluminum hydroxy sulfite which are separated and the aluminum hydroxy sulfite oxidized to aluminum sulfate.

9 Claims, 3 Drawing Figures

METHOD OF MANUFACTURING ALUMINUM SULFATE FROM FLUE GAS

This is a continuation, of application Ser. No. 877,038, filed Feb. 10, 1978 now abandoned.

BACKGROUND OF THE INVENTION

The high price and shortage of natural gas have stimulated the interest of many industrial operations to convert to coal as a fuel. Much of the coal and oil contains a significant amount of sulfur dioxide which must be eliminated to avoid air pollution. There are a number of pollution control techniques that attempt to eliminate sulfur dioxide. These techniques usually require disposing of sulfur dioxide, or some other compound to which it is converted, as a waste material. A typical method involves passing sulfur dioxide containing gas through water. This produces sulfur dioxide which is difficult to dispose of. It is becoming increasingly difficult and expensive to dispose of waste materials without pollution or some type of damage to the environment. In addition, a valuable resource is lost by the destruction of these valuable sulfur containing compounds.

Applicant has discovered a process for converting sulfur dioxide in flue gases into commercially useable aluminum sulfate. The process also produces sodium sulfite which can be readily oxidized to sodium sulfate. This conversion process can be conducted at the fuel burning facility which greatly reduces the cost of pollution control. This process is especially attractive because many industrial operations use aluminum sulfate and/or sodium sulfite or sodium sulfate. Applicant's process can be operated to remove sufficient sulfur dioxide from the effluent flue gas to comply with the most rigid pollution control standards. Contrary to present preferences, it is frequently desirable to utilize coal or oil with a high sulfur content. According to the present invention, sodium aluminate ($Na_2Al_2O_4$) in an aqueous solution or suspension is reacted with dilute sulfur dioxide in a gaseous or aqueous media. This reaction can be conducted in a conventional wet scrubber for industrial flue gases. The reaction product is a soluble sodium sulfite ($Na_2SO_3$) and a precipitate containing an aluminum hydroxy sulfite. The precipitate can be separated from the soluble sodium sulfite by conventional means such as filtration. The precipitate can then be oxidized to aluminum sulfate. The sodium sulfite can be oxidized to sodium sulfate.

BRIEF DESCRIPTION OF THE DRAWINGS

For a better understanding of the invention reference may be had to the following detailed description taken in conjunction with the accompanying drawings which are schematic block diagrams of systems which are particularly well suited for the on site conversion of sulfur dioxide in flue gases to aluminum sulfate and sodium sulfite or sodium sulfate. The drawings are simplified diagrammatic illustrations of apparatus suitable to conduct the process of this invention.

DETAILED DESCRIPTION OF THE DRAWINGS

Figure 1:
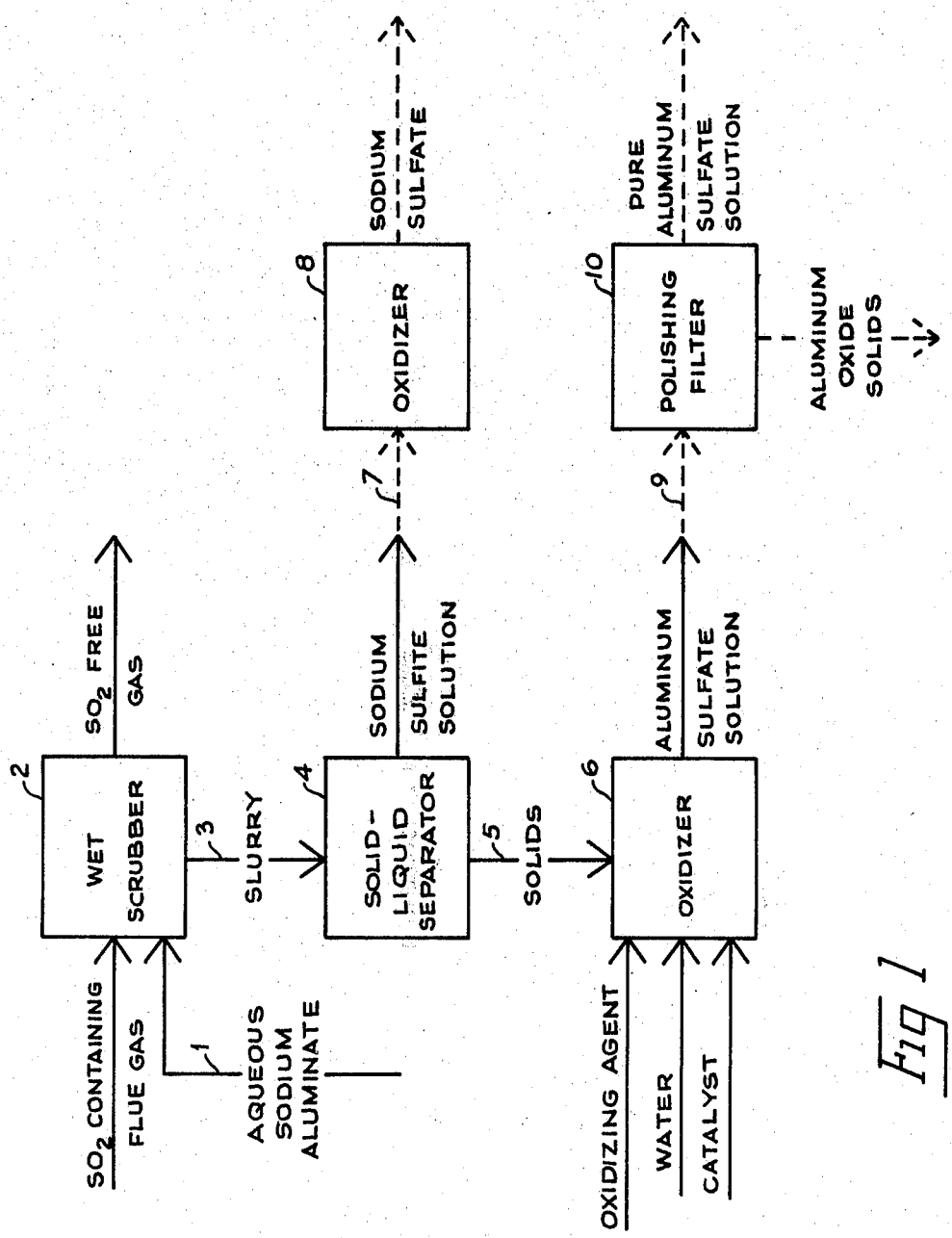
FIG. 1 is a block flow diagram of a process in which sodium aluminate solution is introduced into a wet scrubber and the reaction products are separated.

With reference to FIG. 1, the numeral 1 indicates an aqueous solution of sodium aluminate which is circulated through a conventional wet scrubber indicated by the numeral 2. A venturi scrubber which can be operated with a low gas pressure drop is preferred. The solvents used for sulfur dioxide in this process will permit a low liquid to gas ratio. This process could be used with various gas-liquid contacting devices, such as a packed column or a fume eductor. The hot flue gas is cooled and humidified by scrubbing with water. Typically this gas contains from 1000 to 6000 parts per million of sulfur dioxide. The cooling and humidifying can be done before the flue gas is reacted with the sodium aluminate in the scrubber 2. Dry particulate matter, such as fly ash, in the flue gas can be removed by an electrostatic filter, bag house or cyclone separator before entering the wet scrubber. The sulfur dioxide is absorbed into the solution in the scrubber. The stripped gas with at least 90% of the sulfur dioxide removed is vented to the atmosphere through a stack. From 0.20 to 2 mols of sodium aluminate per mol of sulfur dioxide are needed to achieve satisfactory pollution control and production of commercial quantities of aluminum sulfate and sodium sulfite. The precise ratio depends upon the method of contacting the reactants, efficiency of the reaction and the amount of sulfur dioxide that can be permitted in the effluent flue gas. Total solids in the sodium aluminate solution may vary from 1 to 15% by weight with 4 to 8% solids being preferred. The pH of the solution may vary from 2 to 10 but a pH of 6 to 7 is preferred. The temperature of the sodium aluminate solution may vary from 40° C. to 70° C., but 55° to 58° C. is preferred. The reaction in the scrubber 2 produces sodium sulfite and aluminum hydroxy sulfite, which is transported in the slurry in which it is formed by a conduit indicated by the numeral 3 to a solid liquid separator indicated by the numeral 4. As the aluminum hydroxy sulfite is an insoluble precipitate in the pH range of 3.5 to 10.5, it can be readily separated by adjusting the pH and separating by conventional means, such as filtration. The preferred range for precipitation is from 6.0 to 8.0. At lower pH levels (i.e., below 3.0) the aluminum hydroxy sulfite becomes more soluble in the slurry. Sodium entrapment occurs in the filter cake at high pH levels. The temperature of the slurry should be maintained between 40° C. and 60° C. to achieve sharp separation. Preferably the temperature should be maintained between 40° C. and 50° C. If the preferred pH and temperature ranges are employed, the precipitate will contain only a minute quantity of sodium compounds.

The aluminum hydroxy sulfite precipitate is then transported by suitable means indicated by the numeral 5 to an oxidizer indicated by the numeral 6. The precipitate is reslurried in water and preferably heated between 60° C. and 90° C. Hydrogen peroxide, oxygen and air can be used as oxidizing agents, with air being preferred for economy reasons. A catalyst, such as a soluble iron compound may be needed to improve the yield. Among the satisfactory iron catalysts are ferric sulfite, ferric sulfate, ferrous sulfite and ferrous sulfate. The reaction time can be reduced to approximately 16 to 20 minutes by vigorously contacting the slurry with air. Conducting the reaction in a closed vessel reduces the escape of sulfur dioxide into the air. The reaction time may be further reduced by operating at pressures greater than atmospheric. The oxidation produces aluminum sulfate which can then be separated by conventional means from the slurry. A small amount of $Al_2O_3$ will also be produced which can be recycled through the entire process by adding it to the scrubber indicated by the numeral 2 or reacting it with sulfuric acid to form aluminum sulfate. The soluble aluminum sulfate can then be used in many commercial processes.

The sodium sulfite filtrate can be used in that form in some industries. The filtrate contains virtually no aluminum. The sodium sulfite can be concentrated by evaporation. If sodium sulfate is desired, the solution can be transported by a conduit indicated by the numeral 7 to a conventional oxidizer indicated by the numeral 8. In some industries, such as the paper industry, the sodium sulfites can be reduced to sodium sulfide which may be commercially desirable.

The aluminum sulfate solution can be transported by a conduit indicated by the numeral 9 to a polishing filter indicated by the numeral 10 to separate any undissolved solids from the solution if greater purity of aluminum sulfate is desired. These solids may be recycled by mixing with the sodium aluminate and introducing into the wet solution.

Figure 2:
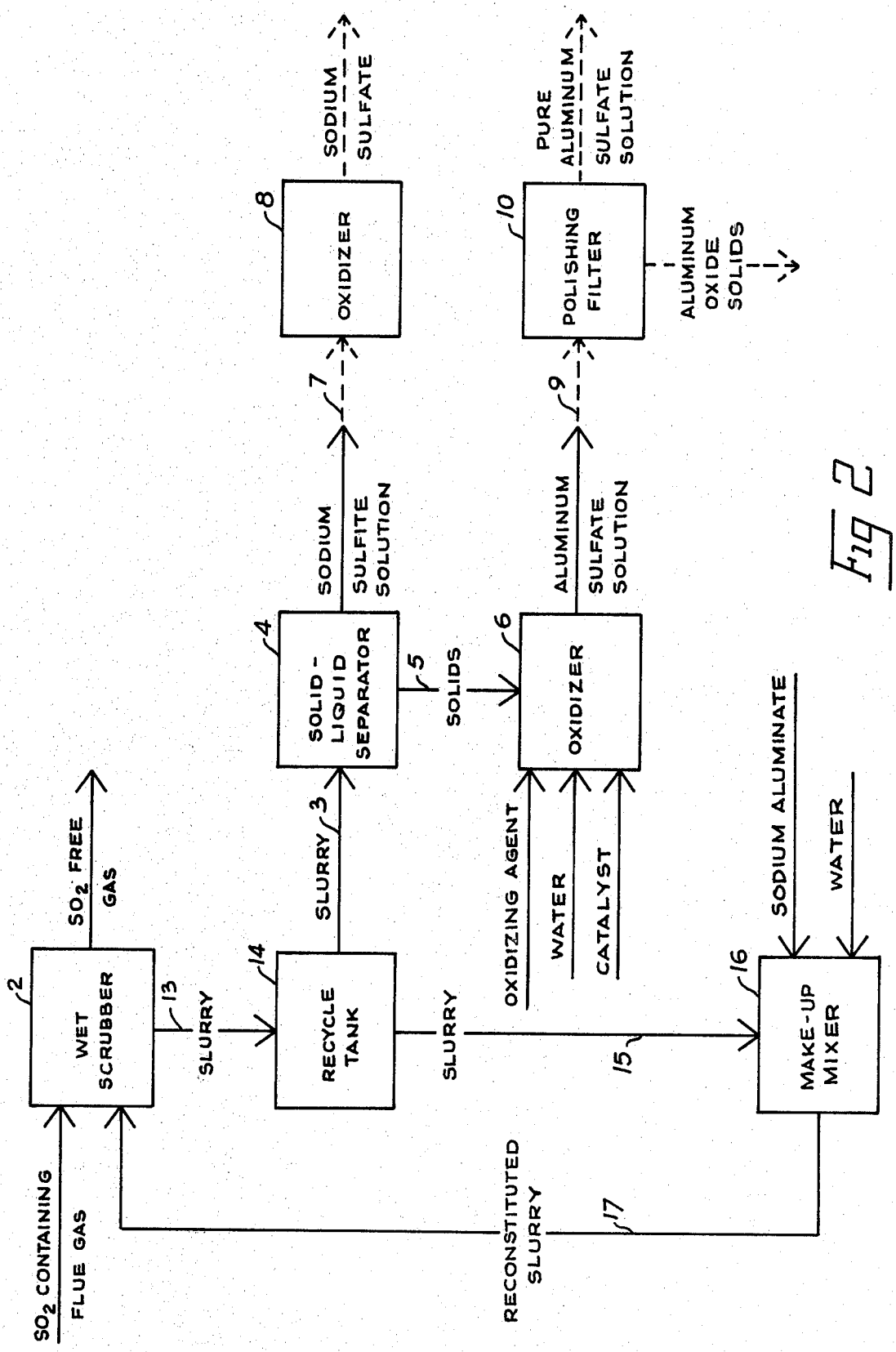
FIG. 2 is a block flow diagram of a similar process, but involves recycling a portion of the slurry leaving the scrubber.

FIG. 2 is a block diagram of a system in which a portion of the sodium sulfite and aluminum hydroxy sulfite produced by the reaction of sulfur dioxide and sodium aluminate are recycled through the wet scrubber 2. The slurry of aluminum hydroxy sulfite and sodium sulfite produced is transported by conduit indicated by the numeral 13 to a recycle tank indicated by the numeral 14. A portion of the slurry is transported by conduit indicated by the numeral 3 to a solid liquid separator indicated by the numeral 4 and separated and processed as shown in FIG. 1 and the description thereto. Another portion of the slurry is transported by conduit indicated by the numeral 15 to a makeup mixer indicated by the numeral 16. Sufficient sodium aluminate and water are added and mixed to bring the reactant slurry up to the desired strength. The slurry is then recirculated to the scrubber 2 by a conduit indicated by the numeral 17.

Figure 3:
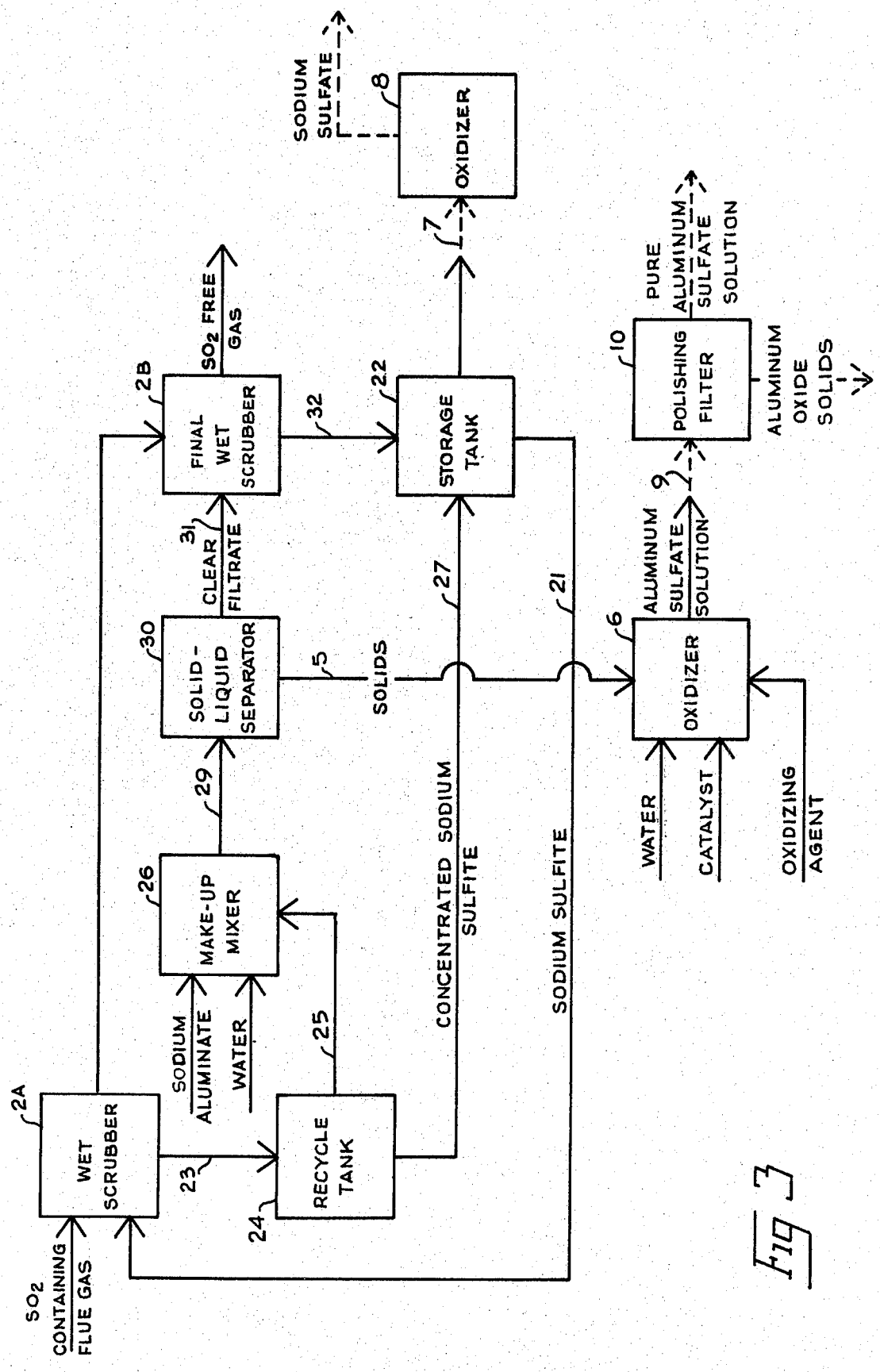
FIG. 3 is a block flow diagram of a process in which two scrubbers are used, with a portion of the slurry recycled through the first scrubber and the solids removed from the remaining slurry and the filtrate recycled through the second scrubber.

FIG. 3 is a block diagram of a system involving two scrubbers and the recycling of sodium sulfite-sodium bisulfite. In the first scrubber indicated by the numeral 2A, the sulfur dioxide flue gas is reacted with a sodium sulfite-bisulfite solution transported by conduit indicated by the numeral 21 from a storage tank indicated by the numeral 22. This sodium sulfite-bisulfite solution has a pH from 4.5 to 8.0, preferably 6.0 to 7.0. The reaction with sulfur dioxide in the wet scrubber 2A results in a fairly high concentration of sodium sulfite-bisulfite in the discharge leaving the scrubber. The solution may absorb excess sulfur dioxide which is converted to sulfurous acid. The discharge from wet scrubber 2A is transferred by conduit indicated by the numeral 23 to a recycle tank indicated by the numeral 24.

A portion of the discharge is transferred by conduit indicated by the numeral 25 to the makeup mixer indicated by the numeral 26. Another portion is transferred by conduit indicated by the numeral 27 to the storage tank 22 for recycling. Sufficient sodium aluminate is added in the makeup mixer 26 to bring the pH up to between 6 and 7 and to insure there is a sufficient quantity present so that nearly all of the sulfur dioxide reacts in the second scrubber indicated by the numeral 2B. The amount necessary can be determined by the sulfur dioxide vapor pressure. Water is also added to reduce the concentration. The slurry is then conducted by conduit indicated by the numeral 29 to a solid liquid separator indicated by the numeral 30. The aluminum hydroxy sulfite is separated and conveyed by conduit indicated by the numeral 5 for further processing as described in connection with FIG. 1. Removal of a portion of the aluminum hydroxy sulfite each time results in only a small amount being recycled through scrubber 2A. The clear filtrate of sodium sulfite is conducted by conduit indicated by the numeral 31 to its final wet scrubber 2B for reaction with remaining sulfur dioxide in the flue gas. The slurry, which has a fairly high concentration of sodium sulfite, is conducted by conduit indicated by the numeral 32 to a storage tank indicated by the numeral 22 for recycling. A portion of the sodium sulfite can be withdrawn from the storage tank by conduit as indicated by the numeral 7 for use or further processing as described in connection with FIG. 1.

Recycling of sodium sulfite-bisulfite offers several advantages over the recycling of mixed slurry of sodium sulfite and aluminum hydroxy sulfite as described in connection with FIG. 2. Removing most of aluminum hydroxy sulfite from the slurry to be recycled reduces the opportunity for solids to build up in the wet scrubber which interferes with the process. In addition, a greater quantity of sulfur dioxide is absorbed in the solution as it is more soluble in sodium sulfite solutions than water alone. The sodium sulfite buffers the scrubbing slurry and reduces the pH drop as the slurry goes through the scrubber and absorbs sulfur dioxide. This reduces the corrosion in the scrubber. The sodium sulfite is concentrated by the evaporation of water as the flue gas is humidified and cooled on introduction to the first scrubber, which permits the absorption of a greater quantity of sulfur dioxide and also reduces the quantity of liquid to be processed and recycled. This process also reduces the amount of sodium aluminate that must be used because the sodium aluminate is added after some sulfur dioxide is already in solution as a result of absorption in the first scrubber. Under these circumstances the sodium aluminate has the capacity to react with a greater quantity of sulfur dioxide than when the sodium aluminate is in solution at the time of reaction with the sulfur dioxide.

Thus, applicant has developed a process for removing sulfur dioxide from flue gas and converting it to valuable chemicals. This process is especially attractive because it can be conducted on site.

The embodiments of the invention in which an exclusive privilege is claimed are defined as follows:

1. A continuous process for removing sulfur dioxide from sulfur dioxide containing flue gas which comprises:
   (a) Continuously contacting an aqueous solution, at a temperature of from 40° to 70° C., containing from 1 to 15 percent by weight sodium aluminate and having a pH between 2 and 10 with a sulfur dioxide containing flue gas at a ratio of between 0.20 and 2 mols of sodium aluminate per mol of sulfur dioxide in a gas-liquid contacting device so that at least a substantial portion of the sulfur dioxide in the flue gas is absorbed into the aqueous solution where it reacts with sodium aluminate to produce sodium sulfite and aluminum hydroxy sulfite;

(b) Transporting the aqueous solution of sodium sulfite and aluminum hydroxy sulfite to a solid-liquid separator and adjusting the pH and temperature of the solution until the aluminum hydroxy sulfite forms an insoluble precipitate, which is then separated from the solution by suitable separating means; and (c) Transporting the aluminum hydroxy sulfite precipitate to an oxidizing reactor where water is added to form a slurry which is maintained at a temperature of from 60° to 90° C. and an oxidizing agent is used to oxidize the aluminum hydroxy sulfite to aluminum sulfate which is then separated from the slurry by suitable separating means.

2. The process of claim 1 in which the gas-liquid contacting device is a venturi scrubber, the aqueous solution contains from 4 to 3% by weight sodium aluminate, and air is the oxidizing agent for oxidizing the aluminum hydroxy sulfite and a suitable catalyst is used in the oxidization.

3. The process of claim 2 in which the catalyst is selected from the group consisting of ferric sulfate, ferric sulfite, ferrous sulfite and ferrous sulfate.

4. The process of claim 1 in which the separated sodium sulfite is oxidized to sodium sulfate using a suitable oxidizing agent.

5. The process of claim 1 in which a substantial portion of the solution of sodium sulfite and aluminum hydroxy sulfite produced is mixed with the aqueous solution containing sodium aluminate and recycled through the gas-liquid contacting device, and the remaining portion of sodium sulfite and aluminum hydroxy sulfite are separated.

6. The process of claim 5 in which the gas-liquid contacting device is a venturi scrubber and air is the oxidizing agent for oxidizing the aluminum hydroxy sulfite and a suitable catalyst is used in the oxidization.

7. A process for removing sulfur dioxide from sulfur dioxide containing flue gas which comprises contacting the flue gas with a recycled aqueous sodium sulfite-sodium bisulfite solution at a first gas-liquid contacting device so that at least a substantial portion of the sulfur dioxide in the flue gas is absorbed into the aqueous sodium sulfite-sodium bisulfite solution, removing said solution from the gas-liquid contacting device and retaining a substantial portion of said solution for recycling through the first gas-liquid contacting device, and adding sodium aluminate to the remaining portion of said solution, separating any aluminum hydroxy sulfite from the remaining portion of said solution by any suitable separating means and contacting the aluminum hydroxy sulfite with a suitable oxidizing agent so that it is oxidized to aluminum sulfate, and contacting said solution remaining after such separation with flue gas at a second gas-liquid contacting device so that at least a substantial portion of the remaining sulfur dioxide in the flue gas is absorbed into said remaining solution, removing said solution from the second gas-liquid contacting device and removing a substantial portion of the sodium sulfite produced by conventional means and mixing the remaining portion of said solution with the portion of said solution retained for recycling through the first gas-liquid contacting device.

8. The process of claim 7 in which the gas-liquid contacting devices are venturi scrubbers and air is the oxidizing agent for oxidizing the aluminum hydroxy sulfite and a suitable catalyst is used in the oxidization.

9. The process of claim 8 in which the catalyst is selected from the group consisting of ferric sulfate, ferric sulfite, ferrous sulfate and ferrous sulfite.

* * * * *